(12) United States Patent
Verma et al.

(10) Patent No.: US 11,750,662 B2
(45) Date of Patent: *Sep. 5, 2023

(54) MULTI-ACCESS EDGE COMPUTING SERVICES SECURITY IN MOBILE NETWORKS BY PARSING APPLICATION PROGRAMMING INTERFACES

(71) Applicant: Palo Alto Networks, Inc., Santa Clara, CA (US)

(72) Inventors: Sachin Verma, Danville, CA (US); Leonid Burakovsky, Pleasanton, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/720,213

(22) Filed: Apr. 13, 2022

(65) Prior Publication Data

US 2022/0247792 A1 Aug. 4, 2022

Related U.S. Application Data

(63) Continuation of application No. 16/779,253, filed on Jan. 31, 2020, now Pat. No. 11,343,285.

(51) Int. Cl.
*H04L 9/40* (2022.01)
*H04W 12/08* (2021.01)
(Continued)

(52) U.S. Cl.
CPC ........ *H04L 63/205* (2013.01); *H04L 63/0236* (2013.01); *H04W 12/08* (2013.01); *H04W 12/121* (2021.01); *H04W 24/08* (2013.01)

(58) Field of Classification Search
CPC ............. H04L 63/205; H04L 63/0236; H04W 12/121; H04W 12/08; H04W 24/08
See application file for complete search history.

(56) References Cited

U.S. PATENT DOCUMENTS 9,219,751 B1 * 12/2015 Chen ................... H04W 12/084
9,509,804 B2 * 11/2016 Stevens ................... H04L 67/02
(Continued)

OTHER PUBLICATIONS

3GPP, 3GPP TS 23.501 V16.3.0, (Dec. 2019), 3rd Generation Partnership Project; Technical Specification Group Services and System Aspects; System architecture for the 5G System (5GS);Stage 2, (Release 16).

(Continued)

*Primary Examiner* — Thaddeus J Plecha
(74) *Attorney, Agent, or Firm* — Van Pelt, Yi & James LLP

(57) ABSTRACT

Techniques for providing multi-access edge computing (MEC) services security in mobile networks (e.g., service provider networks for mobile subscribers, such as for 5G networks) by parsing Application Programming Interfaces (APIs) are disclosed. In some embodiments, a system/process/computer program product for MEC services security in mobile networks by parsing APIs in accordance with some embodiments includes monitoring network traffic on a mobile network at a security platform to identify an API message associated with a new session, wherein the mobile network includes a 5G network or a converged 5G network that includes a multi-access edge computing (MEC) service; extracting mobile network identifier information from the API message at the security platform; and determining a security policy to apply at the security platform to the new session based on the mobile network identifier information.

20 Claims, 11 Drawing Sheets

(51) Int. Cl.
*H04W 24/08* (2009.01)
*H04W 12/121* (2021.01)

(56) References Cited

U.S. PATENT DOCUMENTS

| | | | | |
|---|---|---|---|---|
| 10,708,306 | B2* | 7/2020 | Verma | H04L 63/029 |
| 10,721,272 | B2* | 7/2020 | Verma | H04W 12/06 |
| 10,812,532 | B2* | 10/2020 | Verma | H04L 63/0272 |
| 10,834,136 | B2* | 11/2020 | Verma | H04L 63/0236 |
| 11,019,077 | B2* | 5/2021 | Verma | H04L 63/205 |
| 11,343,285 | B2* | 5/2022 | Verma | H04L 63/1408 |
| 2002/0069356 | A1* | 6/2002 | Kim | H04L 63/1408 |
| | | | | 713/160 |
| 2007/0276957 | A1 | 11/2007 | King | |
| 2011/0116382 | A1* | 5/2011 | McCann | H04W 4/24 |
| | | | | 370/241 |
| 2016/0142427 | A1* | 5/2016 | de los Reyes | H04L 63/1441 |
| | | | | 726/23 |
| 2017/0094015 | A1* | 3/2017 | Liang | H04L 65/80 |
| 2019/0268777 | A1* | 8/2019 | Simon | H04L 45/64 |
| 2020/0285991 | A1 | 9/2020 | Panda | |
| 2020/0389843 | A1* | 12/2020 | Huang | H04W 8/08 |
| 2021/0168615 | A1* | 6/2021 | Guan | H04W 8/26 |
| 2021/0409375 | A1* | 12/2021 | Burakovsky | H04L 63/1458 |

OTHER PUBLICATIONS

ETSI, ETSI GS MEC 012 V1.1.1 (Jul. 2017), Group Specification, Mobile Edge Computing (MEC); Radio Nework Infomnation API, pp. 1-57.

ETSI, ETSI GS MEC 013 V2.1.1 (Sep. 2019), Group Specification, Mulit_Access Edge Computing (MEC); Location API, pp. 1-39.

ETSI, ETSI GS MEC 014 V1.1.1 (Feb. 2018), Group Specification, Mobile Edge Computing (MEC); UE Identity API, pp. 1-13.

ETSI, ETSI GS MEC 015 V1.1.1 (Oct. 2017), Mobile Edge Computing (MEC); Bandwidth Management API, pp. 1-20.

ETSI, ETSI GS MEC 029 V2.1.1 (Jul. 2019), Group Specification, Multi-Access Edge Computing (MEC); Fixed Access Infomnation API, pp. 1-50.

* cited by examiner

300a

* Reference Point Interface

300b

^ Service Based Interface

MULTI-ACCESS EDGE COMPUTING SERVICES SECURITY IN MOBILE NETWORKS BY PARSING APPLICATION PROGRAMMING INTERFACES

CROSS REFERENCE TO OTHER APPLICATIONS

This application is a continuation of U.S. patent application Ser. No. 16/779,253 entitled MULTI-ACCESS EDGE COMPUTING SERVICES SECURITY IN MOBILE NETWORKS BY PARSING APPLICATION PROGRAMMING INTERFACES filed Jan. 31, 2020, which is incorporated herein by reference for all purposes.

BACKGROUND OF THE INVENTION

A firewall generally protects networks from unauthorized access while permitting authorized communications to pass through the firewall. A firewall is typically a device or a set of devices, or software executed on a device, such as a computer, that provides a firewall function for network access. For example, firewalls can be integrated into operating systems of devices (e.g., computers, smart phones, or other types of network communication capable devices). Firewalls can also be integrated into or executed as software on computer servers, gateways, network/routing devices (e.g., network routers), or data appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

BRIEF DESCRIPTION OF THE DRAWINGS

Various embodiments of the invention are disclosed in the following detailed description and the accompanying drawings.

DETAILED DESCRIPTION

Figure 1A:
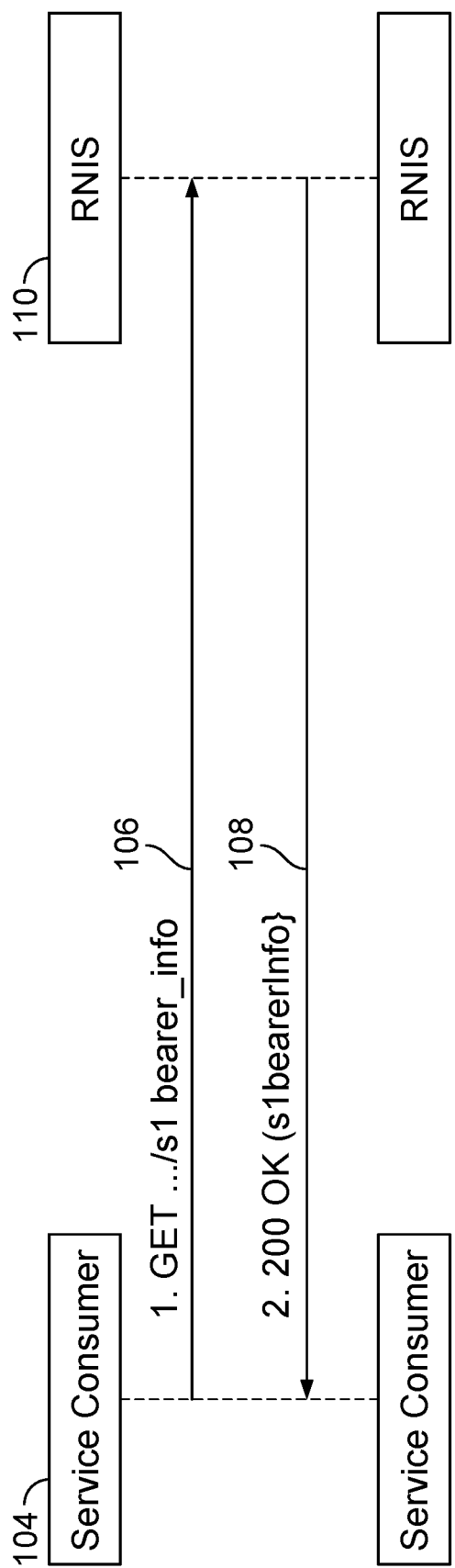
FIG. 1A is a flow diagram illustrating an example of a MEC Radio Network Information (RNI) API.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as software applications on various types of devices or security devices, such as computer servers, gateways, network/routing devices (e.g., network routers), or data appliances (e.g., security appliances or other types of special purpose devices).

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall/security rules or firewall/security policies, which can be triggered based on various criteria, such as described herein). A firewall may also apply anti-virus protection, malware detection/prevention, or intrusion protection by applying a set of rules or policies.

Security devices (e.g., security appliances, security gateways, security services, and/or other security devices) can include various security functions (e.g., firewall, anti-malware, intrusion prevention/detection, proxy, and/or other security functions), networking functions (e.g., routing, Quality of Service (QoS), workload balancing of network related resources, and/or other networking functions), and/or other functions. For example, routing functions can be based on source information (e.g., source IP address and port), destination information (e.g., destination IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., using application layer filtering firewalls or second generation firewalls, which work on the application level of the TCP/IP stack). Application layer filtering firewalls or application firewalls can generally identify certain applications and protocols (e.g., web browsing using Hyper-Text Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform stateful-based packet inspection in which each packet is examined within the context of a series of packets associated with that network transmission's flow of packets/packet flow (e.g., stateful firewalls or third generation firewalls). This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content. In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series next generation firewalls and Palo Alto Networks' VM Series virtualized next generation firewalls).

For example, Palo Alto Networks' next generation firewalls enable enterprises and service providers to identify and control applications, users, and content—not just ports, IP addresses, and packets-using various identification technologies, such as the following: App-ID™ (e.g., App ID) for accurate application identification, User-ID™ (e.g., User ID) for user identification (e.g., by user or user group), and Content-ID™ (e.g., Content ID) for real-time content scanning (e.g., controls web surfing and limits data and file transfers). These identification technologies allow enterprises to securely enable application usage using business-relevant concepts, instead of following the traditional approach offered by traditional port-blocking firewalls. Also, special purpose hardware for next generation firewalls implemented, for example, as dedicated appliances generally provides higher performance levels for application inspection than software executed on general purpose hardware (e.g., such as security appliances provided by Palo Alto Networks, Inc., which utilize dedicated, function specific processing that is tightly integrated with a single-pass software engine to maximize network throughput while minimizing latency for Palo Alto Networks' PA Series next generation firewalls).

Technical and Security Challenges in Today's Mobile Networks for Service Providers In today's service provider network environments, the service provider can typically only implement a static security policy for wireless devices communicating over the service provider's wireless network (e.g., the service provider cannot define a security/firewall policy on a per endpoint basis and/or a per flow basis for wireless devices communicating over the service provider's wireless network), and any changes generally require network infrastructure updates.

Thus, technical and security challenges with service provider networks exist for devices in mobile networks. As such, what are needed are new and improved security techniques for devices in such service provider network environments (e.g., mobile networks). Specifically, what are needed are new and improved solutions for monitoring service provider network traffic and applying security policies (e.g., firewall policies) for devices communicating on service provider networks.

Overview of Techniques for Multi-Access Edge Computing (MEC) Services Security in Mobile Networks By Parsing Application Programming Interfaces (APIs)

As such, technical and security challenges with service provider networks exist for multi-access edge computing (MEC) security in mobile networks. Specifically, what are needed are new and improved techniques for MEC security in such mobile network environments (e.g., 4G/5G mobile networks). More specifically, new and improved solutions for monitoring mobile network traffic and applying security policies (e.g., firewall policies) for MEC security in mobile networks are needed.

Generally, third party cloud service providers are entities offering multi-access edge computing (MEC) application hosting services and resources, while not being traditional network operators. Examples of such third-party providers willing to deploy edge cloud resources include the following: venue and facility owners or management companies; cell tower owners; and neutral host vendors and vehicle fleet management companies (railway, automotive, etc.). Due to operational complexity, costs, or simply difficulty in deploying MEC in hard to reach areas (e.g., due to real estate scarcity, etc.), mobile network operators (MNOs) may buy edge cloud services from such third-party providers to supplement their networks. Typically, MNOs are not involved in day to day management and operation of these third-party edge clouds.

For example, mobile operators generally view multi-access edge computing (MEC) in mobile networks (e.g., in 5G mobile networks) as advantageous to facilitate lower latency for their advanced premium services, such as hosting applications, Internet of Things (IoT) data analytics (e.g., using MEC as an aggregating point for IoT data), and/or other applications/services. Many mobile operators are planning to host third-party 5G applications at edge computing sites (e.g., edge sites) within their 5G networks along with their own services.

Generally, MEC and control plane/user plane separation can facilitate more distribution in 5G networks. For example, a few dozen core sites of a TIER 1 mobile operator in the United States may convert to a few dozen core sites plus 100's to 10000's of distributed local MEC sites in a deployed 5G network.

For example, in 5G mobile networks, multi-access edge computing (MEC) can generally be deployed to lower latency and jitter for advanced premium services, such as hosting applications, Internet of Things (IoT) data analytics (e.g., using MEC as an aggregating point for IoT data), and/or various other applications/services. However, on-premises MEC deployment for enterprises typically lacks signaling/control traffic to extract context for applying security (e.g., network-based security) at a MEC site on user/device traffic.

Accordingly, new and improved security solutions that facilitate applying security (e.g., network-based security) using a security platform (e.g., a firewall (FW)/Next Generation Firewall (NGFW), a network sensor acting on behalf of the firewall, or another device/component that can implement security policies using the disclosed techniques) at a MEC site on user/device traffic are disclosed in accordance with some embodiments. For example, the disclosed solutions can facilitate an investigation of a security event related to a subscriber or a device in a 4G/5G network connecting to a MEC site, such as further described below. As another example, the disclosed solutions can provide a secure IoT service to enterprise/business customers serviced by a MEC site in a mobile network (e.g., a 4G/5G mobile network) as also further described below.

Techniques for providing MEC security (e.g., MEC services security) in mobile networks (e.g., service provider networks for mobile subscribers, such as for 4G/5G networks) are disclosed. In some embodiments, a system/process/computer program product for MEC services security in mobile networks by parsing APIs in accordance with some embodiments includes monitoring network traffic on a mobile network at a security platform to identify an API message associated with a new session, wherein the mobile network includes a 5G network or a converged 5G network that includes a multi-access edge computing (MEC) service; extracting mobile network identifier information from the API message at the security platform; and determining a security policy to apply at the security platform to the new session based on the mobile network identifier information.

For example, the disclosed techniques for providing MEC security in mobile networks (e.g., service provider networks for mobile subscribers, such as for 4G/5G networks) include providing secure MEC services with a security platform in a 5G mobile network.

In one embodiment, the disclosed techniques for providing MEC security in mobile networks include providing secure MEC services with a security platform in a mobile network (e.g., service provider networks for mobile subscribers, such as for 5G networks or converged 5G networks) by parsing one or more MEC services APIs (e.g., MEC services APIs as defined by European Telecommunications Standards Institute (ETSI)).

In an example implementation, based on a security platform deployment topology in a given 5G network (e.g., 5G network or converged 5G network), MEC security can be performed using a security platform in a 5G technology-based mobile network (e.g., using one or more security platforms deployed in various locations) to monitor and parse one or more APIs (e.g., API messages), such as one or more MEC services APIs as defined by ETSI as further described below. Example MEC services APIs currently defined by ETSI that can be parsed using the security platform include the following: (1) Location API (see, e.g., ETSI GS MEC 013 V2.1.1 (2019-09)); (2) Radio Network Information (RNI) API (see, e.g., ETSI GS MEC 012 V1.1.1 (2017-07)); (3) User Equipment (UE) Identity API (see, e.g., ETSI GS MEC 014 V1.1.1 (2018-02)); (4) Bandwidth Management (BM) API (see, e.g., ETSI GS MEC 015 V1.1.1 (2017-10)); and (5) Fixed Access Information (FAI) API (see, e.g., ETSI GS MEC 029 V2.1.1 (2019-07)) (see, e.g., ETSI MEC APIs specifications available at https://www.etsi.org/standards-search#page=1&search=API&title=1&etsiNumber=1&content=0&version=0&onApproval=1&published=1&historical=0&startDate=&endDate=&harmonized=0&keyword=&TB=826, 835&stdType=&frequency=&mandate=&collection=&sort=2). The security platform is configured to extract, for example, subscription related information and/or equipment identifier related information from the parsed API messages. As will be further described below, the disclosed techniques can be performed to provide enhanced MEC security in mobile networks, such as for a service consumer that is a mobile edge application and/or a mobile edge platform.

In another embodiment, the disclosed techniques for providing MEC security in mobile networks include providing secure MEC services with a security platform in a mobile network (e.g., service provider networks for mobile subscribers, such as for 5G networks or converged 5G networks) by parsing one or more Network Exposure Function (NEF) northbound APIs (e.g., NEF northbound APIs as defined by the $3^{rd}$ Generation Partnership Project (3GPP)).

In an example implementation, based on a security platform deployment topology in a given 5G network, MEC security can be performed using a security platform in a 5G technology-based mobile network (e.g., using one or more security platforms deployed in various locations) to monitor and parse one or more APIs (e.g., API messages), such as one or more Network Exposure Function (NEF) northbound APIs as defined by 3GPP as further described below. Example NEF northbound APIs currently defined by 3GPP that can be parsed using the security platform include the NEF Northbound openAPI (see, e.g., 3GPP TS 29.522 V16.1.0, which is available at https://portal.3gpp.org/desktopmodules/Specifications/SpecificationDetails.aspx?specificationId=3437). The security platform is configured to extract, for example, subscription related information and/or equipment identifier related information from the parsed API messages. As will be further described below, the disclosed techniques can be performed to provide enhanced MEC security in mobile networks, such as for a service consumer that is a mobile edge application and/or a mobile edge platform.

In some embodiments, the disclosed techniques for providing MEC security in mobile networks include providing mobile network identifiers correlation in 5G networks for MEC security in 5G networks, such as further described below. As another example, the disclosed techniques for providing MEC security in mobile networks include providing one or more security policies per one or more mobile network identifiers (e.g., including one or more of the following mobile network identifiers: General Public Subscription Identifier (GPSI), Network Slice Selection Assistance Information (NSSAI), and Data Network Name (DNN)) for MEC security in 5G networks (e.g., 5G network or converged 5G network), such as further described below.

In one embodiment, a system/process/computer program product for providing MEC security in mobile networks further includes blocking a new session from accessing a resource based on the security policy.

In one embodiment, a system/process/computer program product for providing MEC security in mobile networks further includes providing service-based security (e.g., performed using a security policy implemented by a security platform that can be applied) per General Public Subscription Identifier (GPSI) in a 5G network (e.g., 5G network or converged 5G network).

In one embodiment, a system/process/computer program product for providing MEC security in mobile networks further includes providing service-based security (e.g., performed using a security policy implemented by a security platform that can be applied) per Network Slice Selection Assistance Information (NSSAI) in a 5G network (e.g., 5G network or converged 5G network).

In one embodiment, a system/process/computer program product for providing MEC security in mobile networks further includes providing service-based security (e.g., performed using a security policy implemented by a security platform that can be applied) per Data Network Name (DNN) in a 5G network (e.g., 5G network or converged 5G network).

In one embodiment, a system/process/computer program product for providing MEC security in mobile networks further includes providing service-based security (e.g., performed using a security policy implemented by a security platform that can be applied) per GPSI, NSSAI, and/or DNN to provide threat identification and/or threat prevention (e.g., for a customer with multiple subscribers, mobile subscribers, and subscriber's devices) in 5G networks (e.g., 5G network or converged 5G network).

In one embodiment, a system/process/computer program product for providing MEC security in mobile networks further includes providing service-based security (e.g., performed using a security policy implemented by a security platform that can be applied) per GPSI, NSSAI, and/or DNN to provide application identification (APP ID) and control (e.g., for a customer with multiple subscribers, mobile subscribers, and subscriber's devices) in 5G networks (e.g., 5G network or converged 5G network).

In one embodiment, a system/process/computer program product for providing MEC security in mobile networks further includes providing service-based security (e.g., performed using a security policy implemented by a security platform that can be applied) per GPSI, NSSAI, and/or DNN to provide Uniform Resource Locator (URL) filtering (e.g., for a customer with multiple subscribers, mobile subscribers, and subscriber's devices) in 5G networks (e.g., 5G network or converged 5G network).

As an example, the disclosed techniques for providing MEC services security by parsing APIs can facilitate using mobile network identifiers (e.g., GPSI, NSSAI, DNN, and/or other information/identifiers extracted from parsed APIs related to MEC services) to provide threat identification and/or threat prevention at the MEC locations.

As another example, the disclosed techniques for providing MEC services security by parsing APIs can facilitate using mobile network identifiers (e.g., GPSI, NSSAI, DNN, and/or other information/identifiers extracted from parsed APIs related to MEC services) to provide enhanced (e.g., granular) application identification and control at the MEC locations.

As yet another example, the disclosed techniques for providing MEC services security by parsing APIs can facilitate using mobile network identifiers (e.g., GPSI, NSSAI, DNN, Location, and/or other information/identifiers extracted from parsed APIs related to MEC services) to provide enhanced (e.g., granular) URL filtering at the MEC locations.

These and other embodiments and examples for providing MEC security in mobile networks will be further described below.

Example System Architectures for Providing Multi-Access Edge Computing (MEC) Services Security in Mobile Networks by Parsing Application Programming Interfaces (APIs)

Generally, 5G is the $5^{th}$ generation of the mobile communications system. The 3rd Generation Partnership Project (3GPP) includes seven telecommunications standard development organizations (ARIB, ATIS, CCSA, ETSI, TSDSI, TTA, TTC). The project covers cellular telecommunications network technologies, including radio access, the core transport network, and service capabilities. The specifications also provide hooks for non-radio access to the core network, and for interworking with Wi-Fi networks and other organizations including ITU, IETF, and ETSI that are developing 5G standards. Some of the improvements of the new 5G network standards include, for example, multi-edge computing, low latency (e.g., approximately less than 10 milliseconds (MS)), high throughput (e.g., multi-Gbps), distribution, network function virtualization infrastructure, as well as orchestration, analytics, and automation.

The 5G architecture is defined in 3GPP TS 23.501 v16.3.0 (e.g., available at https://portal.3gpp.org/desktopmodules/Specifications/SpecificationDetails.aspx?specificationId=3144) as service-based, and the interaction between Network Functions (NFs) is represented in two ways: (1) service-based representation, where NFs within the Control Plane (CP) enable other authorized network functions to access their services; and (2) reference point representation, focuses on the interactions between pairs of NFs defined by point-to-point reference points between any two network functions.

In the 5G architecture, the User Plane Protocol stack between the access network and the core over the backbone network over the N3 interface (e.g., between a Radio Access Network (RAN) and a UPF element) will be based on the GPRS Tunnel Protocol User Plane (GTP-U) over UDP protocol, and also over the N4 interface (e.g., between a UPF element and SMF element) will be based on the Packet Forwarding Control Protocol (PFCP) over UDP protocol. The Control Plane NFs in the 5G system architecture shall be based on the service-based architecture. HTTP/2 will be the protocol used over service-based interfaces. A new 5G Access Network protocol will be based over Stream Control Transmission Protocol (SCTP).

Accordingly, in some embodiments, the disclosed techniques include providing a security platform (e.g., PANOS executing on an NGFW available from Palo Alto Networks, Inc. or another security platform/NFGW) configured to provide DPI capabilities (e.g., including stateful inspection) of, for example, GTP-U sessions and new HTTP/2 based TCP sessions that facilitate a correlation between monitored GTP-U tunnel sessions and new HTTP/2 based TCP sessions as further described below, and as another example, correlation between monitored GTP-U tunnels (e.g., on the N3 interface) and PFCP sessions (e.g., on the N4 interface).

In some embodiments, a security platform (e.g., PANOS executing on an NGFW available from Palo Alto Networks, Inc. or another security platform/NFGW) is configured to provide the following DPI capabilities: stateful inspection of N3 GTP-U tunnels and/or N4 GTP-U tunnels; content inspection of N3 GTP-U tunnels (e.g., to inspect content of inner IP session of N3 GTP-U tunnels) and/or N4 PFCP sessions (e.g., to inspect content of N4 PFCP sessions); support for 3GPP Technical Specification (TS) 29.274 V15.3.0 Release 15 (e.g., and later releases) for Procedures for the 5G system to support 5G cellular technology; and support for 3GPP Technical Specification (TS) 29.281 V15.4.0 Release 14 (e.g., and later releases) for GTP-U protocol.

MEC Services Security in Mobile Networks by Parsing MEC Services APIs

As similarly described above, the disclosed techniques for providing MEC security in mobile networks include providing secure MEC services with a security platform in a mobile network (e.g., service provider networks for mobile subscribers, such as for 5G networks/converged 5G networks) by parsing one or more MEC services APIs (e.g., MEC services APIs as defined by European Telecommunications Standards Institute (ETSI)) in accordance with some embodiments.

In an example implementation, based on a security platform deployment topology in a given 5G network (e.g., 5G network or converged 5G network), MEC security can be performed using a security platform in a 5G technology-based mobile network (e.g., using one or more security platforms deployed in various locations) to monitor and parse one or more APIs (e.g., API messages), such as one or more MEC services APIs as defined by ETSI as further described below. Example MEC services APIs currently defined by ETSI that can be parsed using the security platform include the following: (1) Location API (see, e.g., ETSI GS MEC 013 V2.1.1 (2019-09)); (2) Radio Network Information (RNI) API (see, e.g., ETSI GS MEC 012 V1.1.1 (2017-07)); (3) User Equipment (UE) Identity API (see, e.g., ETSI GS MEC 014 V1.1.1 (2018-02)); (4) Bandwidth Management (BM) API (see, e.g., ETSI GS MEC 015 V1.1.1 (2017-10)); and (5) Fixed Access Information (FAI) API (see, e.g., ETSI GS MEC 029 V2.1.1 (2019-07)) (see, e.g., ETSI MEC APIs specifications available at https://www.etsi.org/standards-search#page=1&search=API&title=1&etsiNumber=1&content=0&version=0&onApproval=1&published=1&historical=0&startDate=&endDate=&harmonized=0&keyword=&TB=826,835&stdType=&frequency=&mandate=&collection=&sort=2). The security platform is configured to extract, for example, subscription related information and/or equipment identifier related information from the parsed API messages. As will be further described below, the disclosed techniques can be performed to provide enhanced MEC security in mobile networks, such as for a service consumer that is a mobile edge application and/or a mobile edge platform.

FIG. 1A is a flow diagram illustrating an example of a MEC Radio Network Information (RNI) API. As used herein, a service consumer is a mobile edge application or a mobile edge platform. Specifically, FIG. 1A is a flow of a service consumer requesting S1 bearer information as provided in ETSI GS MEC 012 V1.1.1 (2017-07).

As shown, a service consumer 104 sends a GET . . . /s1 bearer_info request as shown at 106 to a Radio Network Information Service (RNIS) 110. RNIS 110 responds to the request as shown at 108. In this example, information in a resource 's1 bearer information' in an RNI is used to identify GTP-U tunnel and context, such as location and user identity (e.g., Temporary UE Identity—MTMSI; Location Information—E-UTRAN Cell GLOBAL Identifier (ECGI) including Mobile Country Code (MCC), Mobile Network Code (MNC), and Cell ID; and S1-U GTP-U Tunnel Identifiers including eNodeB GTP-U Tunnel Endpoint Identifier (TEID) and Serving Gateway (SGW) GTP-U TEID).

Figure 1B:
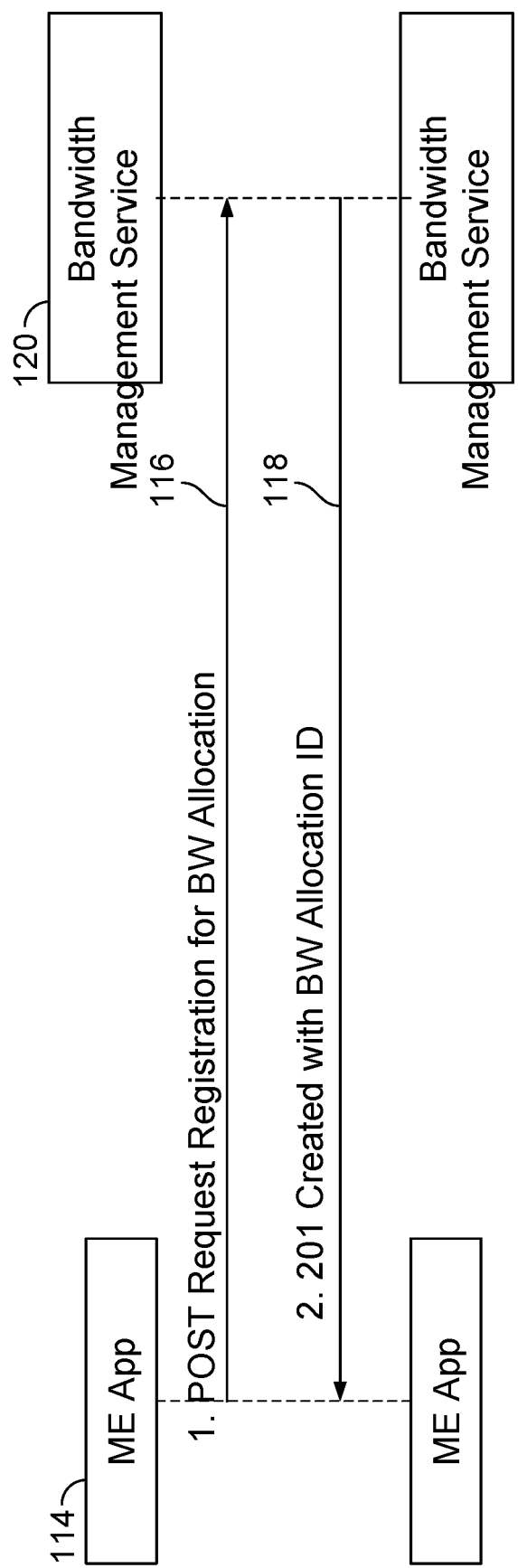
FIG. 1B is a flow diagram illustrating an example of a Bandwidth Management (BWM) API.

FIG. 1B is a flow diagram illustrating an example of a Bandwidth Management (BWM) API. Specifically, FIG. 1B is a flow of a service consumer requesting registration for bandwidth (BW) allocation as provided in ETSI GS MEC 015 V1.1.1 (2017-10).

As shown, a Multi-Edge (ME) App 114 sends a BW allocation request as shown at 116 to a Bandwidth Management Service 120. Bandwidth Management Service 120 responds to the request as shown at 118. As shown in this example, the BWM API enables all registered applications to statically and/or dynamically register for specific bandwidth allocation per session/application.

For example, information in resource 'Individual bandwidthAllocation' in the BWM API is used to identify a session and context, such as the bandwidth and the application (e.g., including sourceIP—source address identity of session (including an IP address range); sourcePort—source port identity of session; dstAddress—destination address identity of session; dstPort—destination port identity of session; protocol—protocol number; fixedAllocation—size of requested fixed BW allocation in bits per second (bps); and appInsId—application instance identifier).

Figure 1C:
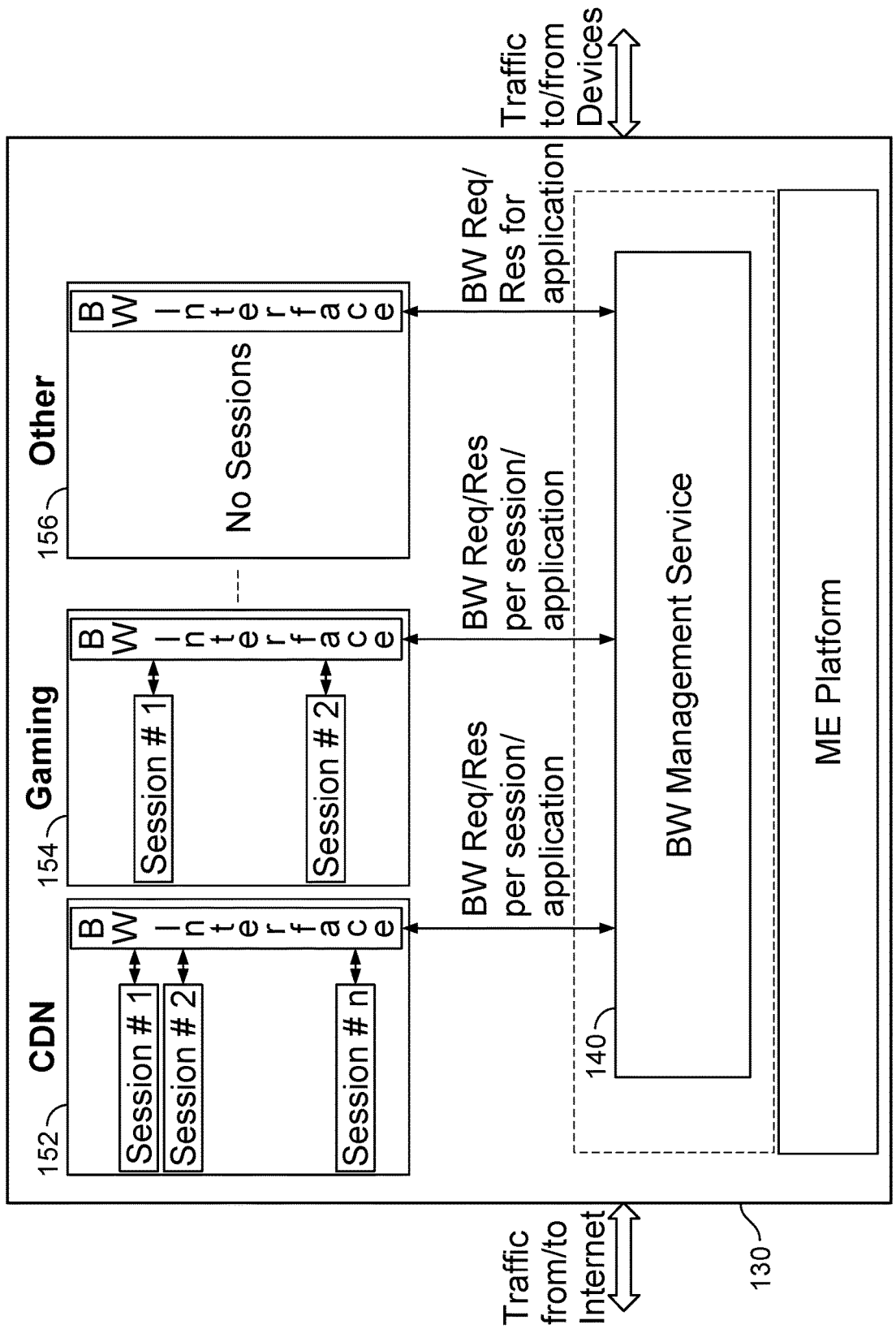
FIG. 1C is a block diagram illustrating an example of a Bandwidth Management (BWM) service.

FIG. 1C is a block diagram illustrating an example of a Bandwidth Management (BWM) service. Specifically, FIG. 1C is a block diagram illustrating an example of a Bandwidth (BW) Management service 140 for a ME platform 130 as provided in ETSI GS MEC 015 V1.1.1 (2017-10). As shown, BW Management service 140 executes on a Multi-Edge (ME) computing platform 130 and facilitates BW Requests (Req)/Responses (Res) per session/application for various sessions/applications, including a Content Delivery Network (CDN) application 152, a Gaming application 154, and other applications/sessions 156 (e.g., for traffic from/to the Internet and traffic to/from Devices).

Figure 2:
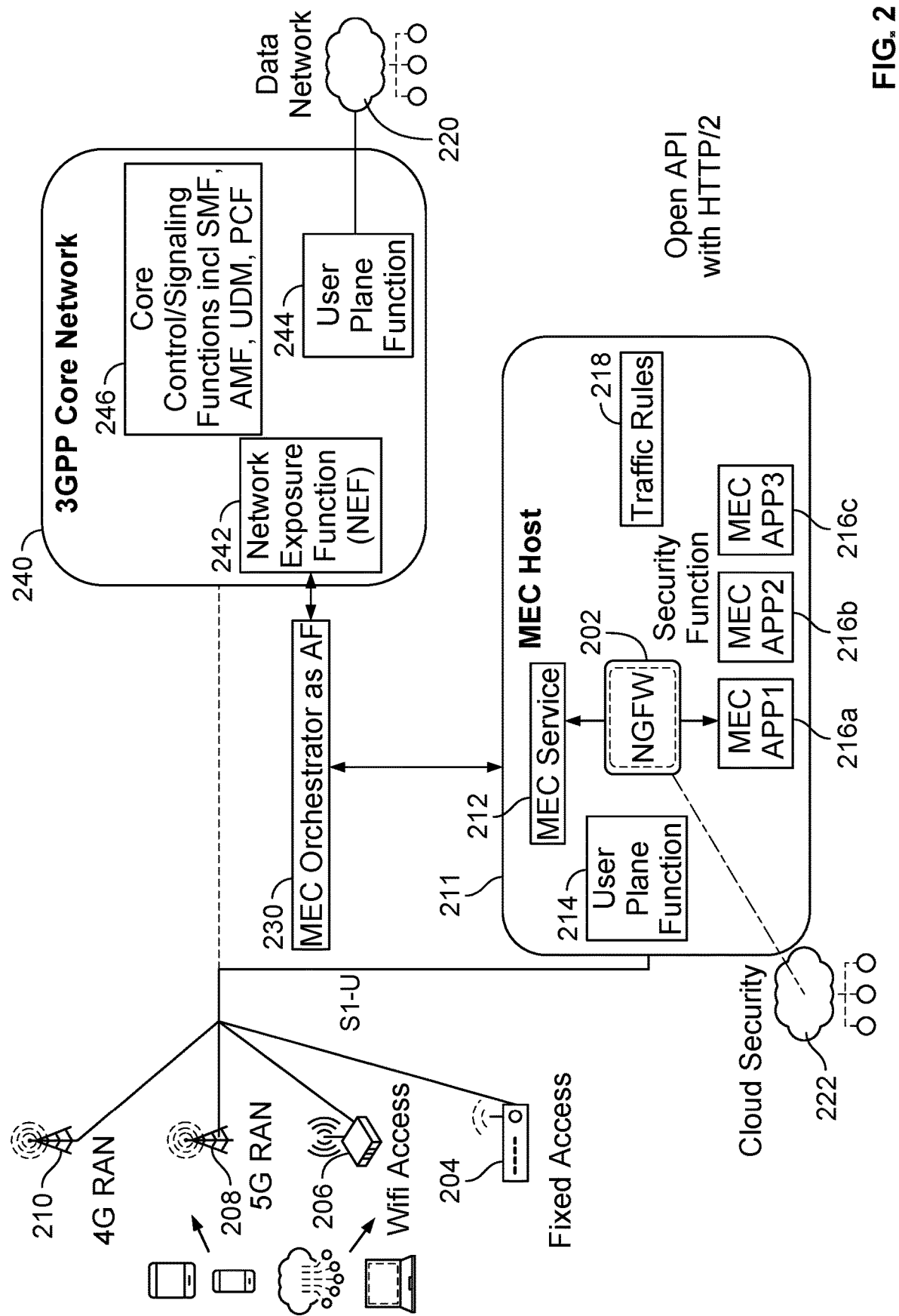
FIG. 2 is a block diagram of an architecture of a 5G wireless network with a security platform for providing MEC services security in mobile networks by parsing MEC services APIs in accordance with some embodiments.

FIG. 2 is a block diagram of an architecture of a 5G wireless network with a security platform for providing MEC services security in mobile networks by parsing MEC services APIs in accordance with some embodiments. Specifically, FIG. 2 is an example mobile network environment for a multi-edge computing network architecture that includes a Security Function/Platform 202 (e.g., the security function/platform can be implemented using a firewall (FW)/Next Generation Firewall (NGFW), a network sensor acting on behalf of the firewall, or another device/component that can implement security policies using the disclosed techniques) for providing MEC services security as further described below. As shown, the mobile network can also include Fixed/Wired access as shown at 204, Non-3GPP access such as Wi-Fi Access as shown at 206, 5G Radio Access Network (RAN) access as shown at 208, 4G RAN access as shown at 210, and/or other networks (not shown in FIG. 2) to facilitate data communications for subscribers (e.g., using User Equipment (UE), such as smart phones, laptops, computers (which may be in a fixed location), and/or other cellular enabled computing devices/equipment, such as CIoT devices, or other network communication enabled devices) including over a Data Network (e.g., the Internet) 220 to access various applications, web services, content hosts, etc. and/or other networks. As shown in FIG. 2, each of the 5G network access mechanisms 204, 206, 208, and 210 are in communication via a S1-U interface with a 5G User Plane Function 214 of a MEC Host 211, which passes through Security Function/Platform 202. As shown, Security Function/Platform 202 is also in communication with MEC Service 212 as well as MEC APP 1 (216a), MEC APP 2 (216b), and MEC APP 3 (216c). MEC Host 211 also includes/stores traffic rules 218 (e.g., traffic rules such as Quality of Service (QoS) and/or bandwidth allocation, DNS rules).

As also shown in FIG. 2, each of the 5G network access mechanisms 204, 206, 208, and 210 are in communication with a 3GPP Core Network 240. MEC Service 212 is in communication with a MEC Orchestrator as Application Function (AF) 230. MEC Orchestrator as AF 230 is in communication with a Network Exposure Function (NEF) 242. 3GPP Core Network 240 includes a User Plane Function 244, which is in communication with Data Network 220, and Core Control/Signaling Functions including Session Management Function (SMF), Access and Mobility Management Function (AMF), Universal Data Management (UDM), and Policy Control Function (PCF) 246.

Referring to FIG. 2, network traffic communications are monitored using Security Function/Platform 202. As shown, network traffic communications are monitored/filtered in the 5G network using Security Function/Platform 202 (e.g., (virtual) devices/appliances that each include a firewall (FW), a network sensor acting on behalf of the firewall, or another device/component that can implement security policies using the disclosed techniques) configured to perform the disclosed MEC services security techniques including monitoring and parsing MEC services APIs as similarly described above and as further described below.

In an example implementation, MEC services APIs that can be monitored and parsed by Security Function/Platform 202 include MEC services APIs as defined by ETSI as further described below. Example MEC services APIs currently defined by ETSI that can be parsed using the security platform include the following: (1) Location API (see, e.g., ETSI GS MEC 013 V2.1.1 (2019-09)); (2) Radio Network Information (RNI) API (see, e.g., ETSI GS MEC 012 V1.1.1 (2017-07)); (3) User Equipment (UE) Identity API (see, e.g., ETSI GS MEC 014 V1.1.1 (2018-02)); (4) Bandwidth Management (BM) API (see, e.g., ETSI GS MEC 015 V1.1.1 (2017-10)); and (5) Fixed Access Information (FAI) API (see, e.g., ETSI GS MEC 029 V2.1.1 (2019-07)) (see, e.g., ETSI MEC APIs specifications available at https://www.etsi.org/standards-search#page=1&search=API&title=1&etsiNumber=1&content=0&version=0&onApproval=1&published=1&historical=0&startDate=&endDate=&harmonized=0&keyword=&TB=826,835&stdType=&frequency=&mandate=&collection=&sort=2).

In addition, Security Function/Platform 202 can also be in network communication with a Cloud Security Service 222 (e.g., a commercially available cloud-based security service, such as the WildFire™ cloud-based malware analysis environment that is a commercially available cloud security service provided by Palo Alto Networks, Inc., which includes automated security analysis of malware samples as well as security expert analysis, or a similar solution provided by another vendor can be utilized), such as via the Internet. For example, Cloud Security Service 222 can be utilized to provide the Security Platforms with dynamic prevention signatures for malware, DNS, URLs, CNC malware, and/or other malware as well as to receive malware samples for further security analysis.

As will now be apparent, network traffic communications can be monitored/filtered using one or more security platforms for network traffic communications in various locations within the 5G network (e.g., 5G network or converged 5G network) to facilitate MEC services security.

MEC Services Security in Mobile Networks by Parsing NEF APIs

In another embodiment, the disclosed techniques for providing MEC security in mobile networks include providing secure MEC services with a security platform in a mobile network (e.g., service provider networks for mobile subscribers, such as for 5G networks/converged 5G networks) by parsing one or more Network Exposure Function (NEF) northbound APIs (e.g., NEF northbound APIs as defined by the 3$^{rd}$ Generation Partnership Project (3GPP)).

In an example implementation, based on a security platform deployment topology in a given 5G network (e.g., 5G network or converged 5G network), MEC security can be performed using a security platform in a 5G technology-based mobile network (e.g., using one or more security platforms deployed in various locations) to monitor and parse one or more APIs (e.g., API messages), such as one or more Network Exposure Function (NEF) northbound APIs as defined by 3GPP as further described below. Example NEF northbound APIs currently defined by 3GPP that can be parsed using the security platform include the NEF Northbound openAPI (see, e.g., 3GPP TS 29.522 V16.1.0, which is available at https://portal.3gpp.org/desktopmodules/Specifications/SpecificationDetails.aspx?specificationId=3437). The security platform is configured to extract, for example, subscription related information and/or equipment identifier related information from the parsed API messages. As will be further described below, the disclosed techniques can be performed to provide enhanced MEC security in mobile networks, such as for a service consumer that is a mobile edge application and/or a mobile edge platform.

In some embodiments, the disclosed techniques for providing MEC security in mobile networks include providing mobile network identifiers correlation in 5G networks for MEC security in 5G networks, such as further described below. As another example, the disclosed techniques for providing MEC security in mobile networks include providing one or more security policies per one or more mobile network identifiers (e.g., including one or more of the following mobile network identifiers: International Mobile Subscription Identity (IMSI) (e.g., IMSI is unique not more than 15 digits which shall be allocated to each mobile subscriber as specified in 3GPP TS 23.003), International Mobile Equipment Identifier (IMEI) (e.g., IMEI is a 15 or 16 digit unique equipment identity as specified in 3GPP TS 23.003), and/or Network Access Identifier (NAI) (e.g., NAI is the user identity submitted by the client during network access authentication, and for roaming, the NAI can be to identify the user as well as to assist in the routing of the authentication request, and it is also used for private networks as specified in 3GPP TS 23.003)) for MEC security in 5G networks, such as further described below.

A first example of a NEF Northbound API that the disclosed techniques can parse for providing secure MEC services is the Traffic Influence API. Attributes included in a Traffic influence subscription (TrafficInfluSub) include the following: DNN, which identifies a Data Network Name (DNN); SNSSAI, which identifies a Network Slice Selection Assistance Information (SNSSAI); GPSI, which identifies a user; IPv4Addr, which identifies the IPv4 address; IPv6Addr, which identifies the IPv6 address; MACAddr, which identifies the MAC address; and afAppID, which identifies an application. As such, information in parsed TrafficInfluence API can be used to identify the IP data flow and context, such as DNN, SNSSAI, GPSI, MAC address, and/or application to facilitate enhanced security for MEC services using the disclosed techniques as further described below.

A second example of a NEF Northbound API that the disclosed techniques can parse for providing secure MEC services is the IPTVConfiguration API. Attributes included in IptvConfigData include the following: DNN, which identifies a Data Network Name (DNN); SNSSAI, which identifies a Network Slice Selection Assistance Information (SNSSAI); GPSI, which identifies a user; multiAccCtrls, which identifies a list of multicast address access control information; IPv4Addr, which identifies the IPv4 address of multicast channel; IPv6Addr, which identifies the IPv6 address of multicast channel; and afAppID, which identifies an application. As such, information in parsed IPTVConfiguration API can be used to identify the multicast address associated with the flow and context, such as DNN, SNSSAI, GPSI, and/or an application to facilitate enhanced security for MEC services using the disclosed techniques as further described below.

Figure 3A:
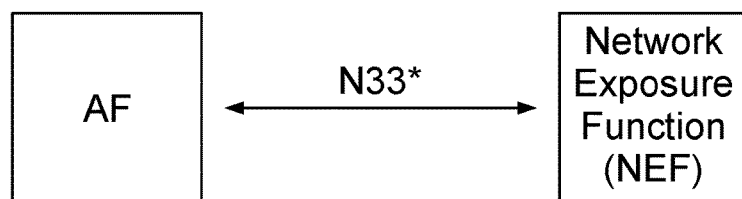
FIG. 3A is a block diagram illustrating a reference point interface and service-based interface of NEF Northbound APIs.
Figure 3A:
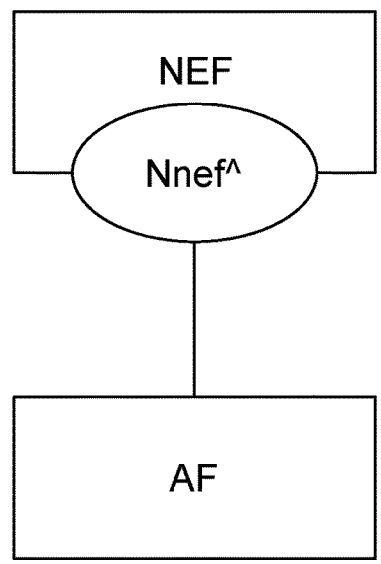

FIG. 3A is a block diagram illustrating a reference point interface and service-based interface of NEF Northbound APIs. As shown in FIG. 3A, a reference point interface of an NEF Northbound API is illustrated at 300a, and a service-based interface of an NEF Northbound interface is illustrated at 300b. The NEF Northbound interface resides between the Network Exposure Function (NEF) and the Application Function (AF). The AF can be provided by the third party. For example, a Mobile Edge Application or a Mobile Edge Platform can act as the AF.

Figure 3B:
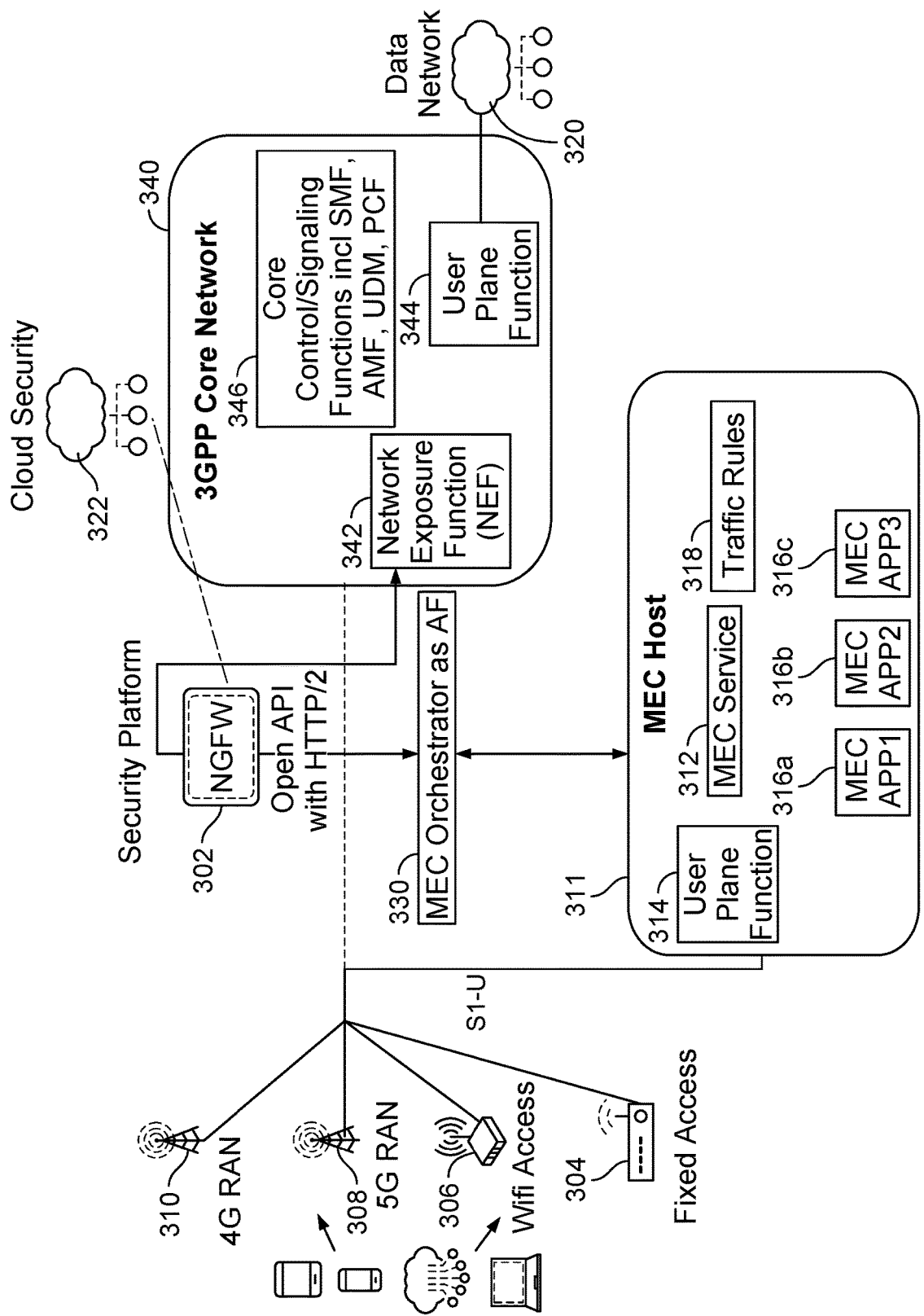
FIG. 3B is a block diagram of an architecture of a 5G wireless network with a security platform for providing MEC services security in mobile networks by parsing NEF Northbound APIs in accordance with some embodiments.

FIG. 3B is a block diagram of an architecture of a 5G wireless network with a security platform for providing MEC services security in mobile networks by parsing NEF Northbound APIs in accordance with some embodiments. FIG. 3B is an example mobile network environment for a multi-edge computing network architecture that includes a Security Function/Platform 302 (e.g., the security function/platform can be implemented using a firewall (FW)/Next Generation Firewall (NGFW), a network sensor acting on behalf of the firewall, or another device/component that can implement security policies using the disclosed techniques) for providing MEC services security as further described below. As shown, the mobile network can also include Fixed/Wired access as shown at 304, Non-3GPP access such as Wi-Fi Access as shown at 306, 5G Radio Access Network (RAN) access as shown at 308, 4G RAN access as shown at 310, and/or other networks (not shown in FIG. 3B) to facilitate data communications for subscribers (e.g., using User Equipment (UE), such as smart phones, laptops, computers (which may be in a fixed location), and/or other cellular enabled computing devices/equipment, such as CIoT devices, or other network communication enabled devices) including over a Data Network (e.g., the Internet) 320 to access various applications, web services, content hosts, etc. and/or other networks. As shown in FIG. 3B, each of the 5G network access mechanisms 304, 306, 308, and 310 are in communication via a S1-U interface with a 5G User Plane Function 314 of a MEC Host 311. MEC Host 311 also includes MEC Service 312 as well as MEC APP 1 (316a), MEC APP 2 (316b), and MEC APP 3 (316c). MEC Host 311 also includes/stores traffic rules 318 (e.g., traffic rules such as QoS and/or bandwidth allocation, DNS rules, such as similarly described above).

As also shown in FIG. 3B, each of the 5G network access mechanisms 304, 306, 308, and 310 are in communication with a 3GPP Core Network 340. As also shown, MEC Service 312 is in communication with a MEC Orchestrator as Application Function (AF) 330. MEC Orchestrator as AF 330 is in communication via a Security Function/Platform 302 (e.g., via Open API with HTTP/2) with a Network Exposure Function (NEF) 342 in 3GPP Core Network 340. 3GPP Core Network 340 also includes a User Plane Function 344, which is in communication with Data Network 320, and Core Control/Signaling Functions including Session Management Function (SMF), Access and Mobility Management Function (AMF), Universal Data Management (UDM), and Policy Control Function (PCF) 346.

Referring to FIG. 3B, network traffic communications are monitored using Security Function/Platform 302. As shown, network traffic communications are monitored/filtered in the 5G network using Security Function/Platform 302 (e.g., (virtual) devices/appliances that each include a firewall (FW), a network sensor acting on behalf of the firewall, or another device/component that can implement security policies using the disclosed techniques) configured to perform the disclosed MEC services security techniques including monitoring and parsing NEF Northbound APIs as similarly described above and as further described below.

In an example implementation, based on a security platform deployment topology in a given 5G network (e.g., 5G network or converged 5G network), MEC security can be performed using a security platform in a 5G technology-based mobile network (e.g., using one or more security platforms deployed in various locations) to monitor and parse one or more APIs (e.g., API messages), such as one or more Network Exposure Function (NEF) northbound APIs as defined by 3GPP as further described below. Example NEF northbound APIs currently defined by 3GPP that can be parsed using the security platform include the NEF Northbound openAPI (see, e.g., 3GPP TS 29.522 V16.1.0, which is available at https://portal.3gpp.org/desktopmodules/Specifications/SpecificationDetails.aspx?specificationId=3437). The security platform is configured to extract, for example, subscription related information and/or equipment identifier related information from the parsed API messages. As will be further described below, the disclosed techniques can be performed to provide enhanced MEC security in mobile networks, such as for a service consumer that is a mobile edge application and/or a mobile edge platform.

In addition, Security Function/Platform 302 can also be in network communication with a Cloud Security Service 322 (e.g., a commercially available cloud-based security service, such as the WildFire™ cloud-based malware analysis environment that is a commercially available cloud security service provided by Palo Alto Networks, Inc., which includes automated security analysis of malware samples as well as security expert analysis, or a similar solution provided by another vendor can be utilized), such as via the Internet. For example, Cloud Security Service 322 can be utilized to provide the Security Platforms with dynamic prevention signatures for malware, DNS, URLs, CNC malware, and/or other malware as well as to receive malware samples for further security analysis.

As will now be apparent, network traffic communications can be monitored/filtered using one or more security platforms for network traffic communications in various locations within the 5G network (e.g., 5G network or converged 5G network) to facilitate MEC services security.

Thus, these and various other example network architectures can utilize the disclosed security techniques for 5G/converged 5G mobile network environments in which one or more security platforms can be provided to perform traffic monitoring and filtering to provide new and enhanced 5G related security techniques, including enhanced MEC services related security techniques, for 5G/converged 5G mobile networks for service providers based on APIs, signaling, and/or DPI information as similarly described above and further described below. As will now be apparent to one of ordinary skill in the art in view of the disclosed embodiments, one or more security platforms can similarly be provided in various other locations within these network architectures (e.g., an inline, pass-through NGFW, such as shown by Security Functions/Platforms as shown in FIGS. 2 and 3B, and/or implemented as agents, virtual machines (VM) instances, and/or containers, which can be executed on existing devices in the service provider's network, for example, deployed on a MEC host to intercept API traffic between a MEC service and a MEC APP such as shown in FIG. 2, and as another example, deployed between a MEC Orchestrator (as AF) and a NEF such as shown in FIG. 3B) and in various wireless network environments to perform the disclosed MEC services security techniques as further described below.

As an example, the disclosed techniques for providing MEC services security by parsing APIs can facilitate using mobile network identifiers (e.g., GPSI, NSSAI, DNN, and/or other information/identifiers extracted from parsed APIs related to MEC services) to provide threat identification and/or threat prevention at the MEC locations.

As another example, the disclosed techniques for providing MEC services security by parsing APIs can facilitate using mobile network identifiers (e.g., GPSI, NSSAI, DNN, and/or other information/identifiers extracted from parsed APIs related to MEC services) to provide enhanced (e.g., granular) application identification and control at the MEC locations.

As yet another example, the disclosed techniques for providing MEC services security by parsing APIs can facilitate using mobile network identifiers (e.g., GPSI, NSSAI, DNN, Location, and/or other information/identifiers extracted from parsed APIs related to MEC services) to provide enhanced (e.g., granular) URL filtering at the MEC locations.

These and other techniques for providing MEC services security in mobile networks by parsing APIs based on, for example, various information that can be extracted from parsed APIs, such as Data Network Name (DNN), Generic Public Subscription Identifier (GPSI), Network Slice Selection Assistance Information (SNSAI), MACAddr, AfAppID, fixedAllocation, MTMSI, ECGI, IMSI, IMEI, MSISDN, and/or NAI, (e.g., and/or in combination with other DPI and/or NGFW techniques, such as Application-ID, user ID, content ID, URL filtering, etc.) will be further described below.

Example Use Cases of Enhanced Security for 5G Networks for Service Providers

The disclosed techniques for providing enhanced security for 5G mobile/service provider networks using a security platform for security policy enforcement, including MEC services security, can be applied in a variety of additional example use case scenarios for facilitating enhanced and more flexible and dynamic security for 5G mobile/service provider network environments. Additional example use case scenarios will be further described below.

As a first example use case scenario, assume that mobile and converged network operators are offering wireless IoT technologies (e.g., CIoT devices) including Narrowband IoT (NB-IoT) and LTE-M to IoT/M2M customers, such as utilities (e.g., gas, water, electric, etc.), water meter management companies, fleet tracking companies, and/or other types of customers. Most of the CIoT devices do not have compute capabilities and resources to provide security functionality and typically are not securely coded. As a result, this creates an opportunity for mobile and converged network operators to offer network-based security services to these customers that can be provided using the disclosed techniques for enhanced security for CIoT in mobile/service provider networks using a security platform for security policy enforcement (e.g., using inspection and security capabilities based on information extracted from monitored and parsed APIs as described herein).

As a second example use case scenario, assume that mobile and converged network operators are offering wireless IoT technologies (e.g., CIoT devices) including Narrowband IoT (NB-IoT) and LTE-M to IoT/M2M customers, such as utilities (e.g., gas, water, electric, etc.), water meter management companies, fleet tracking companies, and/or other types of customers. Most of the CIoT devices do not have compute capabilities and resources to provide security functionality and typically are not securely coded. As a result, this can lead to CIoT device initiated attacks on the mobile network to which they are connected (e.g., and MEC system). As similarly described herein, the disclosed techniques for enhanced security for CIoT in mobile/service provider networks using a security platform for security policy enforcement including inspection and security capabilities based on information extracted from monitored and parsed APIs can be performed to protect the critical network elements of mobile networks from attacking CIoT devices.

Examples of IoT Threats

Example Smart Home vulnerabilities include the Belkin Wemo UPnP Remote Command Execution Vulnerability. Example router vulnerabilities include the following: (1) Quanta LTE Router RCE Vulnerability; (2) Netgear Pro-SAFE Remote Command Execution Vulnerability; (3) ZTE ZXV10 Router Command Execution Vulnerability; (4) Netgear Firmadyne Command Injection Vulnerability; (5) Sierra Wireless Unauthenticated Command Injection Vulnerability; and (6) D-Link Router Remote Command Execution Vulnerability. Camera vulnerabilities include the Beward IP Camera Remote Command Execution Vulnerability, and Axis Camera Remote Command Execution Vulnerability. The above-described techniques for applying DNN, IMEI, and/or Application-ID based security enforcement in service provider networks can be performed to respond to such example router vulnerabilities. As an example, for one DNN, a mobile operator can define an action block (e.g., to drop and log) for all router related remote code execution vulnerabilities. For another DNN, the mobile operator can choose to define an action alert (e.g., to allow and log) for all router related remote code execution vulnerabilities. As another example, for one Type Allocation Code (TAC) (TAC is first 8 digits of IMEI used to identify the device make and model including, for example, IoT device, mobile phone, table, wearable, modem, WLAN router), a mobile operator can define an action block (e.g., to drop and log) for all router related remote code execution vulnerabilities. For another group of IMEI, the mobile operator can choose to define an action alert (e.g., to allow and log) for all router related remote code execution vulnerabilities.

Additional example vulnerabilities include the following: (1) D-Link DIR-859 Unauthenticated Remote Command Execution Vulnerability; (2) Pirelli ADSL2 Wireless Router Information Disclosure Vulnerability; (3) TP-Link TL-WA850RE Wi-Fi Range Extender Remote Command Execution Vulnerability; (4) FiberHome Mobile Wi-Fi Information Disclosure Vulnerability.

Mirai (malware) botnet attack is an example botnet attack that primarily targets online consumer devices, such as IP cameras and home routers. As an example for one DNN, a mobile operator can define an action block (e.g., to drop and log) for all Mirai Command and Control traffic using antispyware signatures Threat ID: 13999 and 13974 https://threatvault.paloaltonetworks.com/. For another APN, the mobile operator can choose to define an action alert (e.g., to allow and log) for all Mirai Command and Control traffic. As another example for one IMSI group defined by prefix or range, a mobile operator can define an action block (e.g., to drop and log) for all Mirai Command and Control traffic using antispyware signatures Threat ID: 13999 and 13974 https://threatvault.paloaltonetworks.com/. For another IMSI group defined by prefix or range, the mobile operator can choose to define an action alert (e.g., to allow and log) for all Mirai Command and Control traffic.

As will now be apparent in view of the disclosed embodiments, a network service provider/mobile operator (e.g., a cellular service provider entity), a device manufacturer (e.g., an automobile entity, CIoT device entity, and/or other device manufacturer), and/or system integrators can specify such security policies that can be enforced by a security platform using the disclosed techniques to solve these and other technical network security challenges, including technical network security challenges for providing MEC services security for 5G technology-based mobile/service provider network environments.

Example Hardware Components of a Network Device for Providing Multi-Access Edge Computing (MEC) Services Security in Mobile Networks by Parsing Application Programming Interfaces (APIs)

Figure 4:
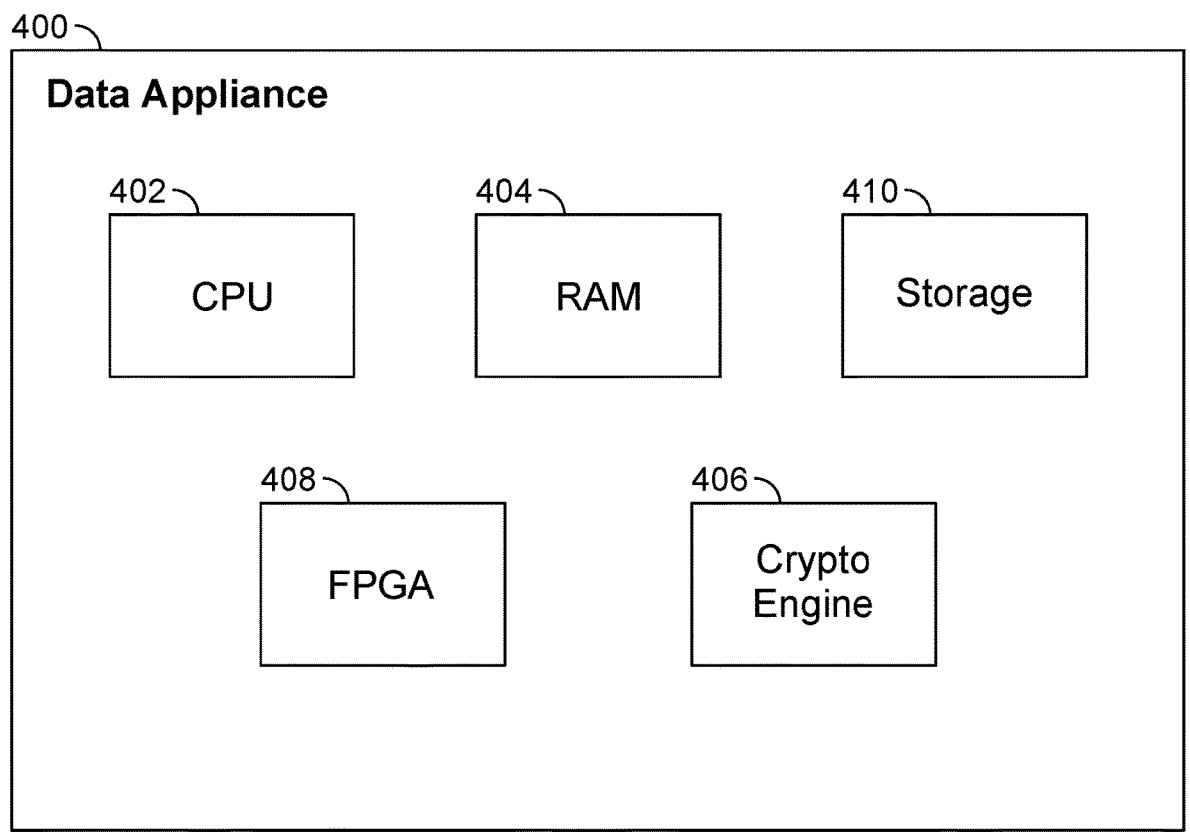
FIG. 4 is a functional diagram of hardware components of a network device for performing MEC services security in mobile networks by parsing APIs in accordance with some embodiments.

FIG. 4 is a functional diagram of hardware components of a network device for performing MEC services security in mobile networks by parsing APIs in accordance with some embodiments. The example shown is a representation of physical/hardware components that can be included in network device 400 (e.g., an appliance, gateway, or server that can implement the security platform disclosed herein). Specifically, network device 400 includes a high performance multi-core CPU 402 and RAM 404. Network device 400 also includes a storage 410 (e.g., one or more hard disks or solid state storage units), which can be used to store policy and other configuration information as well as signatures. In one embodiment, storage 410 stores IMSI, IMEI, MSISDN, NAI, Network Slice information, Data Network Name (DNN), Subscription Permanent Identifier (SUPI), Permanent Equipment Identifier (PEI), General Public Subscription Identifier (GPSI), and/or User Location information, and associated IP addresses and possibly other information (e.g., Application-ID, Content-ID, User-ID, URL, and/or other information including any information and/or parameters that can be extracted from parsed MEC services related APIS, such as described above) that are monitored for implementing the disclosed security policy enforcement techniques using a security platform/firewall device. Network device 400 can also include one or more optional hardware accelerators. For example, network device 400 can include a cryptographic engine 406 configured to perform encryption and decryption operations, and one or more FPGAs 408 configured to perform signature matching, act as network processors, and/or perform other tasks.

Example Logical Components of a Network Device for Providing Multi-Access Edge Computing (MEC) Services Security in Mobile Networks by Parsing Application Programming Interfaces (APIs)

Figure 5:
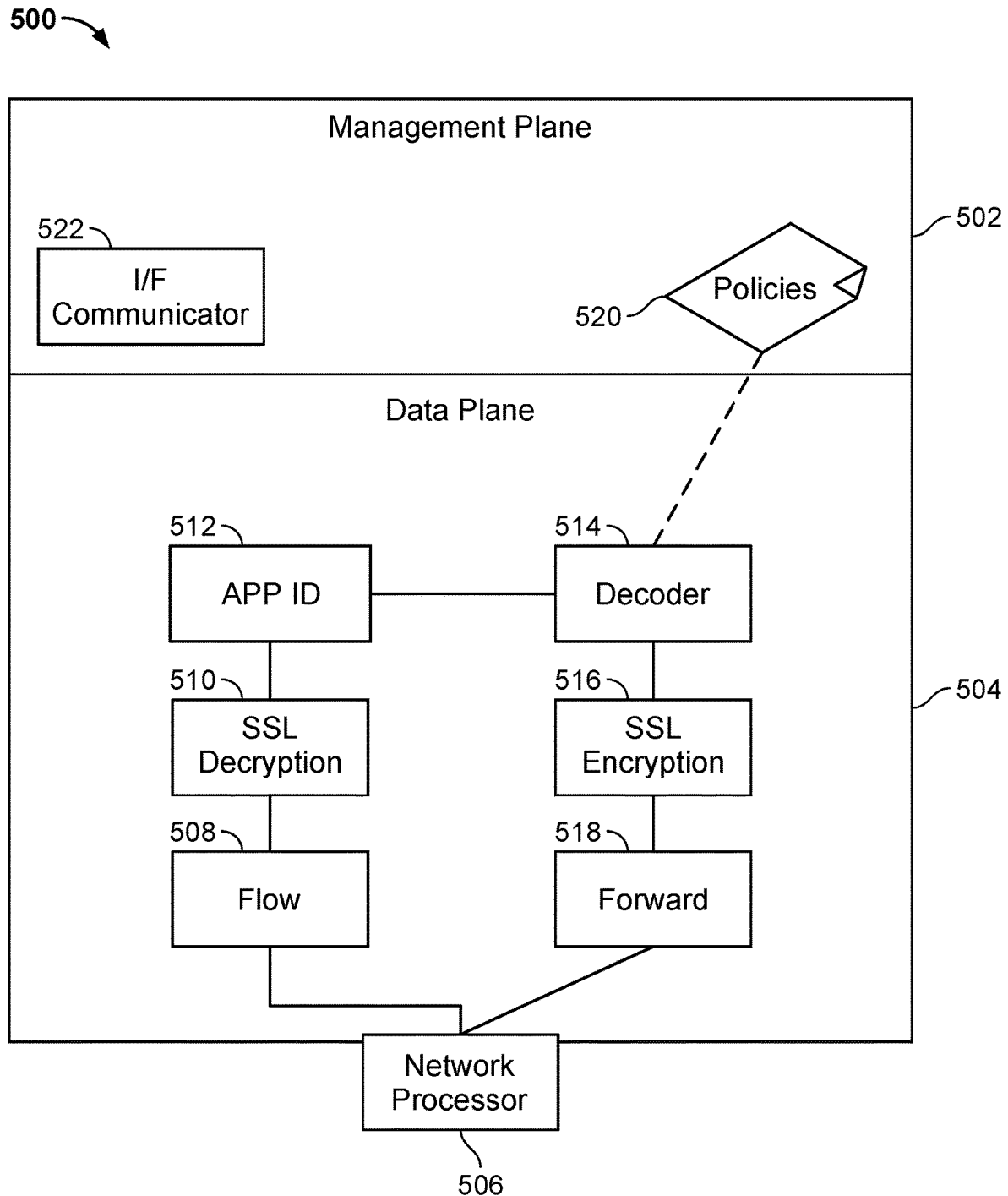
FIG. 5 is a functional diagram of logical components of a network device for performing MEC services security in mobile networks by parsing APIs in accordance with some embodiments.

FIG. 5 is a functional diagram of logical components of a network device for performing MEC services security in mobile networks by parsing APIs in accordance with some embodiments. The example shown is a representation of logical components that can be included in network device 500 (e.g., a data appliance, which can implement the disclosed security function/platform and perform the disclosed techniques for performing MEC services security in mobile networks by parsing APIs). As shown, network device 500 includes a management plane 502 and a data plane 504. In one embodiment, the management plane is responsible for managing user interactions, such as by providing a user interface for configuring policies and viewing log data. The data plane is responsible for managing data, such as by performing packet processing and session handling.

Suppose a mobile device attempts to access a resource (e.g., a remote web site/server, a MEC service, an IoT device such as a CIoT device, or another resource) using an encrypted session protocol, such as SSL. Network processor 506 is configured to monitor packets from the mobile device, and provide the packets to data plane 504 for processing. Flow 508 identifies the packets as being part of a new session and creates a new session flow. Subsequent packets will be identified as belonging to the session based on a flow lookup. If applicable, SSL decryption is applied by SSL decryption engine 510 using various techniques as described herein. Otherwise, processing by SSL decryption engine 510 is omitted. Application identification (APP ID) module 512 is configured to determine what type of traffic the session involves and to identify a user associated with the traffic flow (e.g., to identify an Application-ID as described herein). For example, APP ID 512 can recognize a GET request in the received data and conclude that the session requires an HTTP decoder 514. As another example, APP ID 512 can recognize a GTP-U message (e.g., N4 session establishment request/response messages) and conclude that the session requires a GTP decoder (e.g., to extract information exchanged in the N4 session establishment related messages including various parameters, such as International Mobile Subscription Identity (IMSI), International Mobile Equipment Identifier (IMEI), Mobile Subscriber ISDN (MSISDN), and/or Network Access Identifier (NAI) related information, such as described above). As yet another example, APP ID 512 can recognize an API message (e.g., a MEC services API message or an NEF northbound API message) and conclude that the session requires a corresponding API message decoder (e.g., to extract information exchanged in the API related messages including various parameters, such as DNN, SNSSAI, GPSI, IPV4Addr, IPV6Addr, multiAccCtrls, afAppID, temporary UE identity, tunnel identifiers, and/or location related information, such as described above). For each type of protocol, there exists a corresponding decoder 514. In one embodiment, the application identification is performed by an application identification module (e.g., APP ID component/engine), and a user identification is performed by another component/engine. Based on the determination made by APP ID 512, the packets are sent to an appropriate decoder 514. Decoder 514 is configured to assemble packets (e.g., which may be received out of order) into the correct order, perform tokenization, and extract out information (e.g., such to extract various information exchanged in the N4 session establishment related messages and/or MEC services related API messages as similarly described above and further described below). Decoder 514 also performs signature matching to determine what should happen to the packet. SSL encryption engine 516 performs SSL encryption using various techniques as described herein and the packets are then forwarded using a forward component 518 as shown. As also shown, policies 520 are received and stored in the management plane 502. In one embodiment, policy enforcement (e.g., policies can include one or more rules, which can be specified using domain and/or host/server names, and rules can apply one or more signatures or other matching criteria or heuristics, such as for security policy enforcement for subscriber/IP flows on service provider networks based on various extracted parameters/information from monitored HTTP/2 messages and/or DPI of monitored GTP-U traffic as disclosed herein) is applied as described herein with respect to various embodiments based on the monitored, decrypted, identified, and decoded session traffic flows.

As also shown in FIG. 5, an interface (I/F) communicator 522 is also provided for security platform manager communications (e.g., via (REST) APIs, messages, or network protocol communications or other communication mechanisms). In some cases, network communications of other network elements on the service provider network are monitored using network device 500, and data plane 504 supports decoding of such communications (e.g., network device 500, including I/F communicator 522 and decoder 514, can be configured to monitor and/or communicate on, for example, service-based interfaces such as Nsmf, Nnef and reference point interfaces such as N3, N4, N9, and/or other interfaces where wired and wireless network traffic flow exists). As such, network device 500 including I/F communicator 522 can be used to implement the disclosed techniques for security policy enforcement on mobile/service provider network environments, including MEC services security, as described above and as will be further described below.

Additional example processes for the disclosed techniques for performing MEC services security in mobile networks by parsing APIs will now be described.

Example Processes for Performing Multi-Access Edge Computing (MEC) Services Security in Mobile Networks by Parsing Application Programming Interfaces (APIs)

Figure 6:
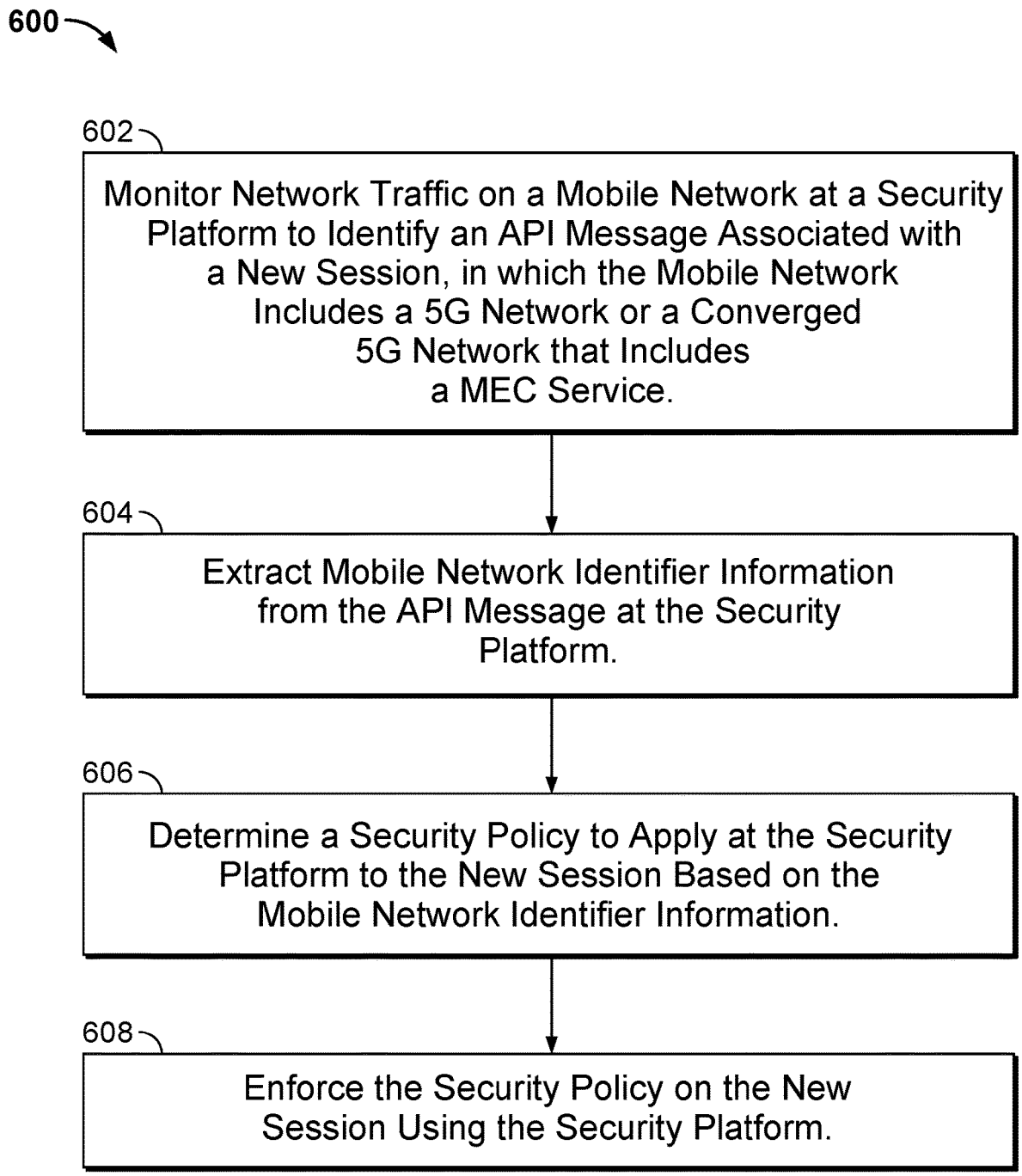
FIG. 6 is a flow diagram of a process for performing MEC services security in mobile networks by parsing APIs in accordance with some embodiments.

FIG. 6 is a flow diagram of a process for performing MEC services security in mobile networks by parsing APIs in accordance with some embodiments. In some embodiments, a process 600 as shown in FIG. 6 is performed by the security platform and techniques as similarly described above including the embodiments described above with respect to FIGS. 1A-5. In one embodiment, process 600 is performed by data appliance 400 as described above with respect to FIG. 4, network device 500 as described above with respect to FIG. 5, a virtual appliance, an SDN security solution, a cloud security service, and/or combinations or hybrid implementations of the aforementioned as described herein.

The process begins at 602. At 602, monitoring network traffic on a mobile network at a security platform to identify an API message associated with a new session is performed, in which the mobile network includes a 5G network or a converged 5G network that includes a MEC service. For example, the security platform (e.g., a firewall, a network sensor acting on behalf of the firewall, or another device/component that can implement security policies) can monitor, in some cases, various protocols, such as HTTP/2 traffic and/or other protocols, on the mobile network and, more specifically, for performing the disclosed techniques can monitor various APIs, more specifically, various MEC services related APIs (e.g., RESTful MEC service APIs; generally, for MEC services, a MEC system deployment may utilize HTTP/2, but this is transparent to the RESTful MEC service APIs, as the main semantic of HTTP has been retained in HTTP/2 to thereby provide backwards compatibility) and/or NEF northbound related APIs (e.g., for NEF northbound related APIs, Nnef is a service based interface, which generally uses HTTP/2 protocol with JSON as the application layer serialization protocol) are monitored as similarly described above.

At 604, extracting mobile network identifier information from the API message at the security platform is performed. For example, the security platform can parse the API message to extract the mobile network identifier information (e.g., the subscription and/or equipment identifier information is identified by an International Mobile Subscription Identity (IMSI), International Mobile Equipment Identifier (IMEI), and/or Mobile Subscriber ISDN (MSISDN) related information) using the disclosed techniques as similarly described above.

At 606, determining a security policy to apply at the security platform to the new session based on the mobile network identifier information is performed. For example, the security policy can be determined and/or enforced based on various combinations of Network Slice information (SNSSAI), Data Network Name (DNN), General Public Subscription Identifier (GPSI), IPV4Addr, IPV6Addr, multiAccCtrls, afAppID, temporary UE identity, tunnel identifiers, Location information, and/or other parameters/information, as similarly described above (e.g., and/or in combination with other DPI-based firewall techniques, such as Application-ID, user ID, content ID, URL filtering, etc.).

In one embodiment, a system/process/computer program product for providing MEC security in mobile networks further includes providing service-based security (e.g., performed using a security policy implemented by a security platform that can be applied) per GPSI, NSSAI, and/or DNN to provide threat identification and/or threat prevention (e.g., for a customer with multiple subscribers, mobile subscribers, and subscriber's devices) in 5G networks.

In one embodiment, a system/process/computer program product for providing MEC security in mobile networks further includes providing service-based security (e.g., performed using a security policy implemented by a security platform that can be applied) per GPSI, NSSAI, and/or DNN to provide application identification (APP ID) and control (e.g., for a customer with multiple subscribers, mobile subscribers, and subscriber's devices) in 5G networks.

In one embodiment, a system/process/computer program product for providing MEC security in mobile networks further includes providing service-based security (e.g., performed using a security policy implemented by a security platform that can be applied) per GPSI, NSSAI, and/or DNN to provide Uniform Resource Locator (URL) filtering (e.g., for a customer with multiple subscribers, mobile subscribers, and subscriber's devices) in 5G networks.

At 608, enforcing the security policy on the new session using the security platform is performed. For example, various enforcement actions (e.g., allow/pass, block/drop, alert, tag, monitor, log, throttle, restrict access, and/or other enforcement actions) can be performed using the security platform as similarly described above.

Figure 7:
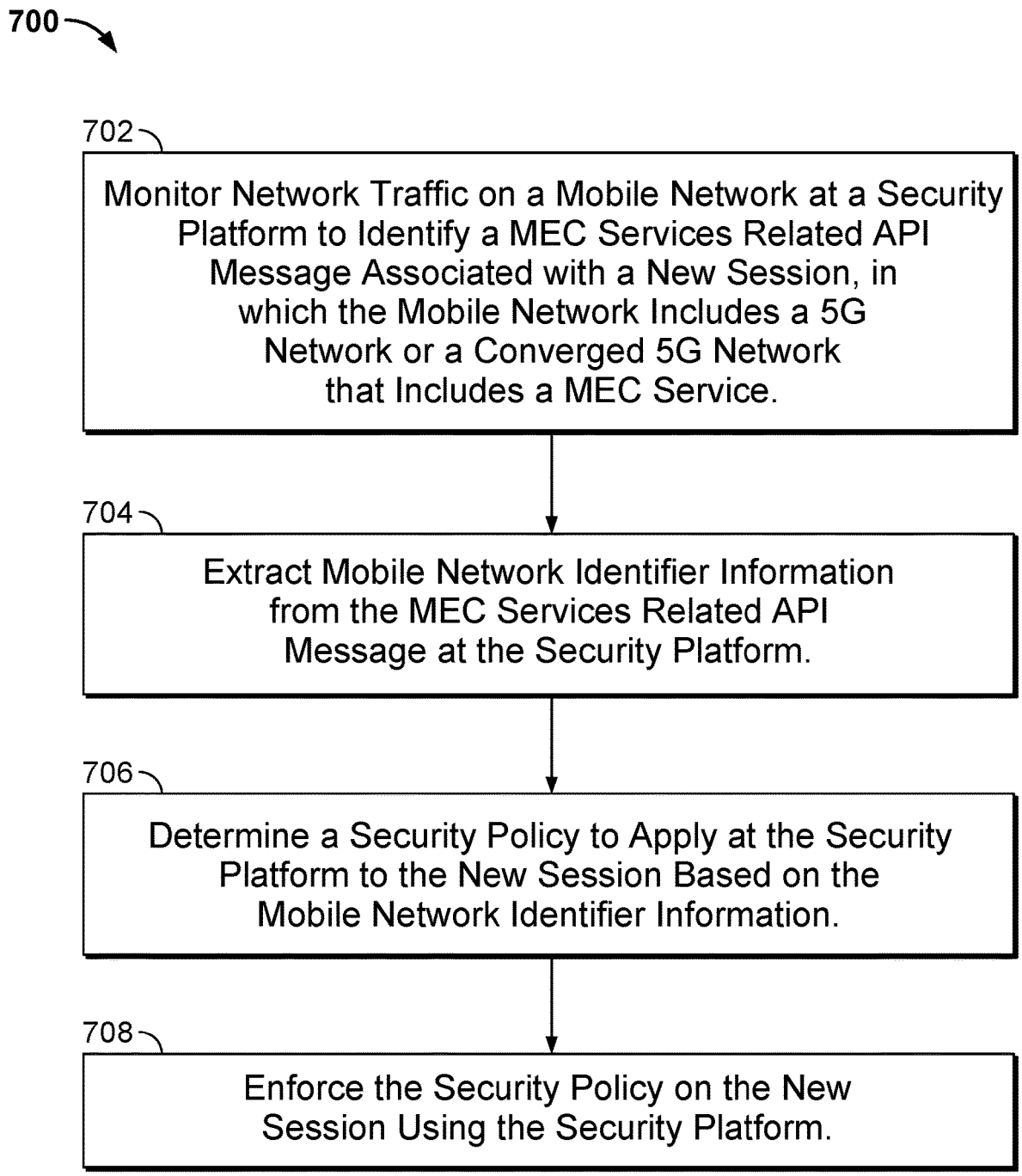
FIG. 7 is another flow diagram of a process for performing MEC services security in mobile networks by parsing APIs in accordance with some embodiments.

FIG. 7 is another flow diagram of a process for performing MEC services security in mobile networks by parsing APIs in accordance with some embodiments. In some embodiments, a process 700 as shown in FIG. 7 is performed by the security platform and techniques as similarly described above including the embodiments described above with respect to FIGS. 1A-5. In one embodiment, process 700 is performed by data appliance 400 as described above with respect to FIG. 4, network device 500 as described above with respect to FIG. 5, a virtual appliance, an SDN security solution, a cloud security service, and/or combinations or hybrid implementations of the aforementioned as described herein.

The process begins at 702. At 702, monitoring network traffic on a mobile network at a security platform to identify a MEC services related API message associated with a new session is performed, in which the mobile network includes a 5G network or a converged 5G network that includes a MEC service. For example, the security platform (e.g., a firewall, a network sensor acting on behalf of the firewall, or another device/component that can implement security policies) can monitor, in some cases, various protocols, such as HTTP/2 traffic and/or other protocols, on the mobile network and, more specifically, for performing the disclosed techniques can monitor various APIs, more specifically, various MEC services related APIs (e.g., RESTful MEC service APIs; generally, for MEC services, a MEC system deployment may utilize HTTP/2, but this is transparent to the RESTful MEC service APIs, as the main semantic of HTTP has been retained in HTTP/2 to thereby provide backwards compatibility) and/or NEF northbound related APIs (e.g., for NEF northbound related APIs, Nnef is a service based interface, which generally uses HTTP/2 protocol with JSON as the application layer serialization protocol) are monitored as similarly described above.

At 704, extracting mobile network identifier information from the MEC services related API message at the security platform is performed. For example, the security platform can parse the MEC services related API message to extract the mobile network identifier information (e.g., the subscription and/or equipment identifier information is identified by an International Mobile Subscription Identity (IMSI), International Mobile Equipment Identifier (IMEI), and/or Mobile Subscriber ISDN (MSISDN) related information) using the disclosed techniques as similarly described above.

At 706, determining a security policy to apply at the security platform to the new session based on the mobile network identifier information is performed. For example, the security policy can be determined and/or enforced based on various combinations of Network Slice information (SNSSAI), Data Network Name (DNN), General Public Subscription Identifier (GPSI), temporary UE identity, tunnel identifiers, Location information, and/or other parameters/information, such as similarly described above (e.g., and/or in combination with other DPI-based firewall techniques, such as Application-ID, user ID, content ID, URL filtering, etc.).

At 708, enforcing the security policy on the new session using the security platform is performed. For example, various enforcement actions (e.g., allow/pass, block/drop, alert, tag, monitor, log, throttle, restrict access, and/or other enforcement actions) can be performed using the security platform as similarly described above.

Figure 8:
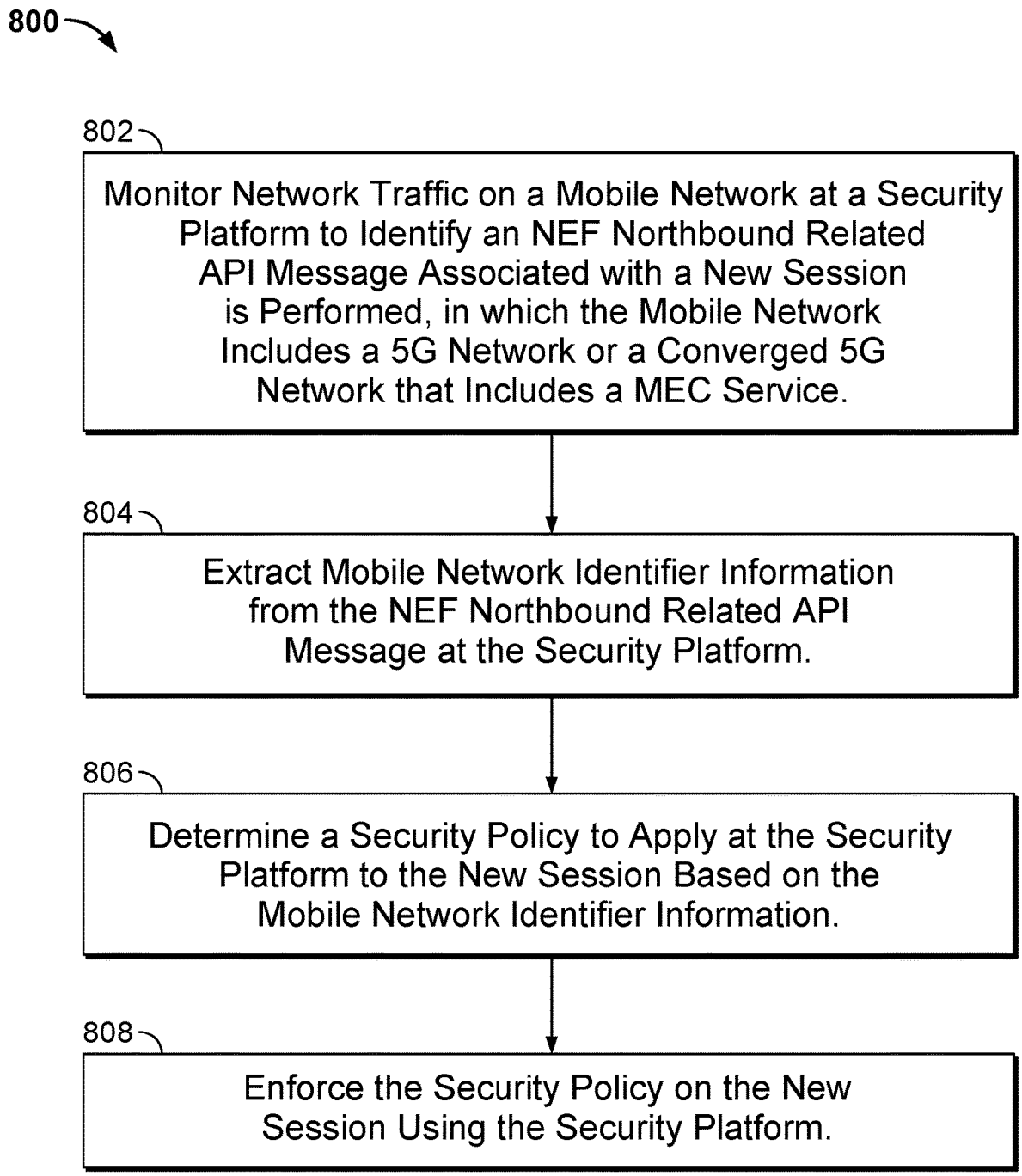
FIG. 8 is another flow diagram of a process for performing MEC services security in mobile networks by parsing APIs in accordance with some embodiments.

FIG. 8 is another flow diagram of a process for performing MEC services security in mobile networks by parsing APIs in accordance with some embodiments. In some embodiments, a process 800 as shown in FIG. 8 is performed by the security platform and techniques as similarly described above including the embodiments described above with respect to FIGS. 1A-5. In one embodiment, process 800 is performed by data appliance 400 as described above with respect to FIG. 4, network device 500 as described above with respect to FIG. 5, a virtual appliance, an SDN security solution, a cloud security service, and/or combinations or hybrid implementations of the aforementioned as described herein.

The process begins at 802. At 802, monitoring network traffic on a mobile network at a security platform to identify an NEF northbound related API message associated with a new session is performed, in which the mobile network includes a 5G network or a converged 5G network that includes a MEC service. For example, the security platform (e.g., a firewall, a network sensor acting on behalf of the firewall, or another device/component that can implement security policies) can monitor, in some cases, various protocols, such as HTTP/2 traffic and/or other protocols, on the mobile network and, more specifically, for performing the disclosed techniques can monitor various APIs, more specifically, various MEC services related APIs (e.g., RESTful MEC service APIs; generally, for MEC services, a MEC system deployment may utilize HTTP/2, but this is transparent to the RESTful MEC service APIs, as the main semantic of HTTP has been retained in HTTP/2 to thereby provide backwards compatibility) and/or NEF northbound related APIs (e.g., for NEF northbound related APIs, Nnef is a service based interface, which generally uses HTTP/2 protocol with JSON as the application layer serialization protocol) are monitored as similarly described above.

At 804, extracting mobile network identifier information from the NEF northbound related API message at the security platform is performed. For example, the security platform can parse the NEF northbound related API message to extract the mobile network identifier information (e.g., the subscription and/or equipment identifier information is identified by an International Mobile Subscription Identity (IMSI), International Mobile Equipment Identifier (IMEI), and/or Mobile Subscriber ISDN (MSISDN) related information) using the disclosed techniques as similarly described above.

At 806, determining a security policy to apply at the security platform to the new session based on the mobile network identifier information is performed. For example, the security policy can be determined and/or enforced based on various combinations of Network Slice information (SNSSAI), Data Network Name (DNN), General Public Subscription Identifier (GPSI), IPV4Addr, IPV6Addr, multiAccCtrls, afAppID, temporary UE identity, tunnel identifiers, Location information, and/or other parameters/information, such as similarly described above (e.g., and/or in combination with other DPI-based firewall techniques, such as Application-ID, user ID, content ID, URL filtering, etc.).

At 808, enforcing the security policy on the new session using the security platform is performed. For example, various enforcement actions (e.g., allow/pass, block/drop, alert, tag, monitor, log, throttle, restrict access, and/or other enforcement actions) can be performed using the security platform as similarly described above.

As will now be apparent in view of the disclosed embodiments, a network service provider/mobile operator (e.g., a cellular service provider entity), a device manufacturer (e.g., an automobile entity, IoT device entity, and/or other device manufacturer), and/or system integrators can specify such security policies that can be enforced by a security platform using the disclosed techniques to solve these and other technical network security challenges for providing MEC services security on mobile networks, including 5G networks.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
monitor network traffic on a mobile network at a security platform to identify an application programming interface (API) message associated with a new session, wherein the mobile network includes a 5G network or a converged 5G network that includes a multi-access edge computing (MEC) service;
extract mobile network identifier information from the API message at the security platform, wherein the mobile network identifier information includes one or more of the following: an International Mobile Subscription Identity (IMSI), International Mobile Equipment Identifier (IMEI), and/or Mobile Subscriber Integrated Services Digital Network (MSISDN); and
enforce a security policy at the security platform to the new session based on the mobile network identifier information; and
a memory coupled to the processor and configured to provide the processor with instructions.

2. The system recited in claim 1, wherein the API message includes a MEC services related API message.

3. The system recited in claim 1, wherein the API message includes a Network Exposure Function (NEF) northbound API message.

4. The system recited in claim 1, wherein the API message includes a MEC services related API message or a Network Exposure Function (NEF) northbound API message.

5. The system recited in claim 1, wherein the security platform is configured with a plurality of security policies based on the mobile network identifier information.

6. The system recited in claim 1, wherein the mobile network identifier information includes one or more of the following: General Public Subscription Identifier (GPSI), Network Slice Selection Assistance Information (NSSAI), and Data Network Name (DNN).

7. The system recited in claim 1, wherein the processor is further configured to:
parse the API message to extract the mobile network identifier information.

8. The system recited in claim 1, wherein the processor is further configured to:
parse the API message to extract the mobile network identifier information, wherein the mobile network identifier information includes one or more of the following: General Public Subscription Identifier (GPSI), Network Slice Selection Assistance Information (NSSAI), and Data Network Name (DNN).

9. The system recited in claim 1, wherein the security platform monitors network traffic in a MEC host to provide MEC services security for a 5G network.

10. The system recited in claim 1, wherein the security platform is configured to perform a firewall service using the mobile network identifier information.

11. The system recited in claim 1, wherein the security platform is configured to perform threat detection using the mobile network identifier information.

12. The system recited in claim 1, wherein the security platform is configured to perform threat prevention using the mobile network identifier information.

13. The system recited in claim 1, wherein the security platform is configured to perform Uniform Resource Link (URL) filtering using the mobile network identifier information.

14. The system recited in claim 1, wherein the processor is further configured to:
block the new session from accessing a resource based on the security policy.

15. The system recited in claim 1, wherein the processor is further configured to:
allow the new session to access a resource based on the security policy.

16. A method, comprising:
monitoring network traffic on a mobile network at a security platform to identify an application programming interface (API) message associated with a new session, wherein the mobile network includes a 5G network or a converged 5G network that includes a multi-access edge computing (MEC) service;
extracting mobile network identifier information from the API message at the security platform, wherein the mobile network identifier information includes one or more of the following: an International Mobile Subscription Identity (IMSI), International Mobile Equipment Identifier (IMEI), and/or Mobile Subscriber Integrated Services Digital Network (MSISDN); and
enforcing a security policy at the security platform to the new session based on the mobile network identifier information.

17. The method of claim 16, wherein the API message includes a MEC services related API message.

18. The method of claim 16, wherein the API message includes a Network Exposure Function (NEF) northbound API message.

19. The method of claim 16, wherein the API message includes a MEC services related API message or a Network Exposure Function (NEF) northbound API message.

20. A computer program product, the computer program product being embodied in a non-transitory tangible computer readable storage medium and comprising computer instructions for:
monitoring network traffic on a mobile network at a security platform to identify an application programming interface (API) message associated with a new session, wherein the mobile network includes a 5G network or a converged 5G network that includes a multi-access edge computing (MEC) service;
extracting mobile network identifier information from the API message at the security platform, wherein the mobile network identifier information includes one or more of the following: an International Mobile Subscription Identity (IMSI), International Mobile Equipment Identifier (IMEI), and/or Mobile Subscriber Integrated Services Digital Network (MSISDN); and enforcing a security policy at the security platform to the new session based on the mobile network identifier information.

\* \* \* \* \*